(12) United States Patent
Popli et al.

(10) Patent No.: US 11,157,978 B2
(45) Date of Patent: Oct. 26, 2021

(54) SYSTEMS AND METHODS FOR MANAGING DATA RELATED TO VEHICLE(S)

(71) Applicant: MAHINDRA & MAHINDRA LIMITED, Mohali (IN)

(72) Inventors: Viren Popli, Mohali (IN); Pardeep Singh, Mohali (IN)

(73) Assignee: MAHINDRA & MAHINDRA LIMITED, Punjab (IN)

( * ) Notice: Subject to any disclaimer, the term of this patent is extended or adjusted under 35 U.S.C. 154(b) by 80 days.

(21) Appl. No.: 16/637,813

(22) PCT Filed: Aug. 8, 2018

(86) PCT No.: PCT/IN2018/050519
§ 371 (c)(1),
(2) Date: Feb. 10, 2020

(87) PCT Pub. No.: WO2019/030775
PCT Pub. Date: Feb. 14, 2019

(65) Prior Publication Data
US 2020/0242677 A1 Jul. 30, 2020

(30) Foreign Application Priority Data

Aug. 8, 2017 (IN) .............................. 201711028211

(51) Int. Cl.
*G06Q 10/00* (2012.01)
*G06Q 10/10* (2012.01)
(Continued)

(52) U.S. Cl.
CPC ......... *G06Q 30/0621* (2013.01); *G06F 16/23* (2019.01); *G06K 7/10366* (2013.01);
(Continued)

(58) Field of Classification Search
CPC ........... G06Q 30/0621; G06Q 10/0875; G06Q 10/10; G06Q 10/1095; G06Q 10/20;
(Continued)

(56) References Cited

U.S. PATENT DOCUMENTS 6,052,068 A  4/2000 Price R-W et al.
8,583,314 B2 11/2013 de Oliveira et al.
(Continued)

OTHER PUBLICATIONS

Rahul (Design and Analysis of Vehicle Sharing of Programs: A System Approach, 2010, (Year: 2010).*
International Search Report dated Apr. 30, 2019, corresponding to International Application No. PCT/IN2018/050519.
(Continued)

*Primary Examiner* — Romain Jeanty
(74) *Attorney, Agent, or Firm* — Hauptman Ham, LLP

(57) ABSTRACT

Embodiments herein disclose a systems and methods for managing data related to a vehicle. Embodiments disclosed herein relate to systems and methods for managing data related to the vehicle, and more particularly to the systems and methods for managing the data related to the vehicle between at least one of customer, dealer, and service center and so on. The system comprises a server, plurality of source devices, plurality of destination devices connected to each other via a communication network. The method includes detecting UHF-RFID tags coupled to the vehicle and plurality of vehicle components. The method includes updating the information in the server regarding the detected vehicle and the vehicle components entering/leaving a stockyard. Also, the method includes displaying the data related to at least one of the vehicle and the vehicle components, based on retrieved data from the server and the determined type of a user profile.

26 Claims, 7 Drawing Sheets

(51) Int. Cl.
*G06Q 30/06* (2012.01)
*G06F 16/23* (2019.01)
*G06K 7/10* (2006.01)
*G06Q 10/08* (2012.01)
*G06Q 30/00* (2012.01)
*B62D 65/16* (2006.01)
*G01C 21/34* (2006.01)

(52) U.S. Cl.
CPC ......... *G06Q 10/0875* (2013.01); *G06Q 10/10* (2013.01); *G06Q 10/1095* (2013.01); *G06Q 10/20* (2013.01); *G06Q 30/012* (2013.01); *G06Q 30/0185* (2013.01); *G06Q 30/0635* (2013.01); *B62D 65/16* (2013.01); *G01C 21/3476* (2013.01)

(58) Field of Classification Search
CPC ............. G06Q 30/012; G06Q 30/0185; G06Q 30/0635; G06F 16/23; G06K 7/10366; B62D 65/16; G01C 21/3476
USPC ....................................................... 705/7.19
See application file for complete search history.

(56) References Cited

U.S. PATENT DOCUMENTS

2007/0229268 A1 10/2007 Swan et al.
2018/0080795 A1* 3/2018 Roy ........................ G01S 19/47

* cited by examiner

SYSTEMS AND METHODS FOR MANAGING DATA RELATED TO VEHICLE(S)

CROSS REFERENCE TO RELATED APPLICATION

The present application is a national stage filing under 35 U.S.C § 371 of PCT application number PCT/IN2018/050519 filed on Aug. 8, 2018 which is based upon and claims the benefit of priorities to Indian Patent Application No. 201711028211, filed on Aug. 8, 2017 in the Indian Patent Office, which are incorporated herein in their entireties by reference.

TECHNICAL FIELD

Embodiments disclosed herein relate to systems and methods for managing a data related to a vehicle, and more particularly to systems and methods for managing the data related to vehicle, between at least one of a customer, a dealer, a service center, and so on.

BACKGROUND

In general, a Dealer Management System (DMS) may not be suitable for an offline mode, due to issues such as branch wise coverage, serving distant area, software updates, requirement of onsite installation, limited data access to the head office/headquarters team. Further, the issues may be specific to hardware requirements, obsolete technology, high levels of data entry at dealership, dealers working on many portals with different credentials, requirement of an operator, and so on.

The conventional systems may require manual or paper work and the UI/UX experience may require an intermediate user to run the system. Furthermore, the conventional system may include capturing of offline data and may not serve the purpose of dealers as well as organization. Further, in some conventional systems, the sales control systems may provide dealer management with integrated negotiation, finance, and lease capabilities and integrate the critical factors of sales management among many other factors into one system for vehicle sales customer information, trade-in payoff, lease duration, credit application, customer cash, vehicle residual and so on.

Generally, conventional systems may be configured to relieve the congestion of prospective customer relevant purchasing information. The customer may be provided with information of delivery, service procedures and procedure to order vehicle components, accessories, and merchandise, electronic tools available to book appointment, rating of dealership, product details and comparisons. Further, the dealer may also be provided with an access to multiple records storing data relating to automobiles in an inventory, said data including vehicle identification numbers (VINs) referenced to automobile site availability and specific features from a set of available automotive features. Further, the conventional systems may not track the movement and may not reflect availability of stockyard corresponding to the vehicle and the vehicle components.

However, the conventional systems may not provide a centralized platform to manage the data associated with the vehicle, to check service, to track vehicle movement, to track vehicle service status, to automatically order vehicle components, to manage the data between, the customer, dealer, salesman, service person and so on.

OBJECTS

The principal object of embodiments herein is to disclose systems and methods for managing data related to a vehicle.

Another object of embodiments herein is to provide a systems and methods to track the movement of the vehicle and plurality of vehicle components and verify the billing status of the vehicle and the vehicle components.

Another of embodiments herein is to provide a systems and methods to customize the vehicle based on retrieved information corresponding to available vehicle and available accessories in a stockyard.

Another object of embodiments herein is to provide a centralized platform for managing and retrieving data between customers, dealer, salesman, service person, vehicle components dealer, management and so on, wherein the centralized platform has an online mode and an offline mode.

Another object of the embodiments herein is to disclose methods and systems for providing different user profiles based on the characteristic of the user such as dealer, sales, service, installer, vehicle components dealer, marketing and so on.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
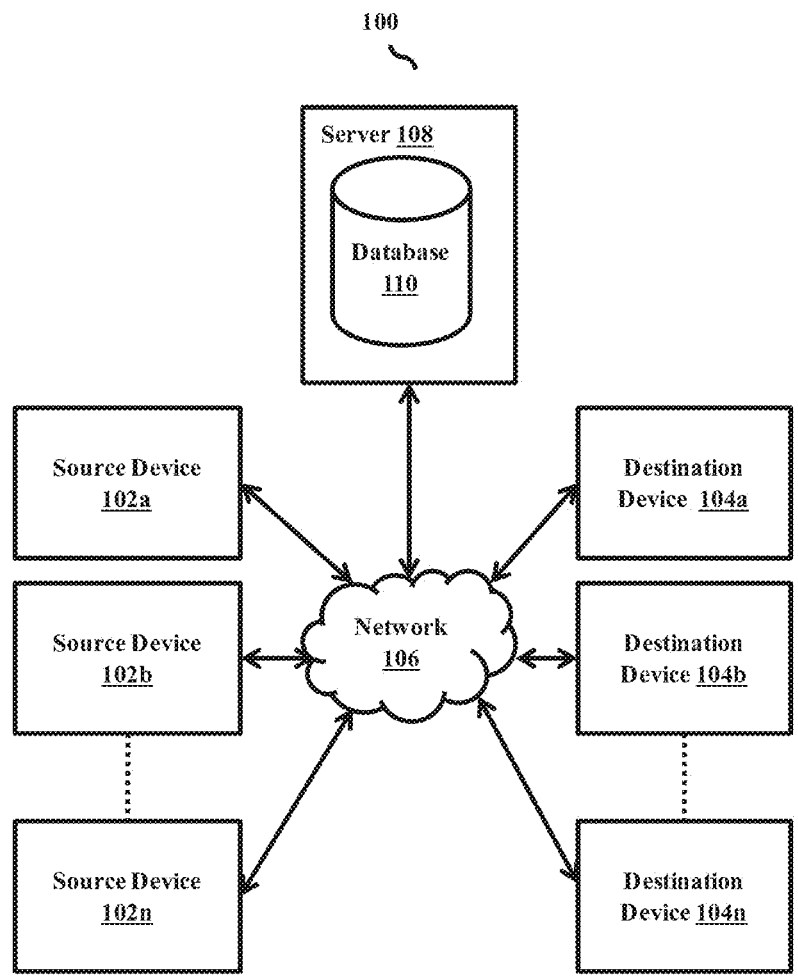
FIG. 1 illustrates a system for managing data related to a vehicle, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve systems and methods for managing data related to a vehicle by providing a centralized platform. Referring now to the drawings, and more particularly to FIGS. 1 through 5f, where similar reference characters denote corresponding features consistently throughout the figures, there are shown embodiments.

FIG. 1 illustrates a system for managing a data related to a vehicle, according to embodiments as disclosed herein. The system 100 comprises a server 108, plurality of a source devices 102a-n, and plurality of a destination devices 104a-n. The source devices 102a, 102b . . . 102n are collectively referred herein as 102a-n and the destination devices 104a, 104b . . . 104n are collectively referred herein as 104a-n. The source device 102a-n and the destination device 104a-n can be connected to the server 108 using a suitable means 106 such as a wireless communication network, a wired network, and so on. The server 108 may be at least one of a standalone server, a cloud based server or a remote server. The server 108 comprises a database 110. The server 108 may further comprise a processor, a memory, a storage unit, a communication interface, a display interface and so on.

Examples of the source device 102a-n can be at least one of, but not limited to, a passive RFID (Radio frequency identification) device, an active RFID device, and a BAP (Battery-Assisted Passive) RFID device, a RAIN (Reliable Array of Independent Nodes) RFID device, a Beacons, and so on. The source device 102a-n can be implemented in at least one of, but not limited to, a vehicle stockyard, a vehicle components stockyard, a showroom, a service center, and so on. The source device 102a-n may include at least one of a sensor and an antenna. The source device 102a-n may comprise an application interface (not shown). The source device 102a-n may comprise other components not shown in the FIG. 1, such as a processor, a memory, a storage unit, a display interface and a communication interface respectively.

Examples of the destination device 104a-n can be at least one of, but not limited to, a mobile device, a smart phone, a desktop computer, a laptop, a tablet, a phablet, an IoT (Internet of Things) device, a wearable computing device, a vehicle infotainment system, an instrument console of the vehicle, and so on. The destination device 104a-n may comprise a user application interface (not shown in FIG. 1). The destination device 104a-n may comprise other components not shown in the FIG. 1, such as a processor, a memory, a storage unit, a display interface and a communication interface respectively.

The source device 102a-n can run a client side application establishing a communication session with external devices, such as the destination device 104a-n, and the server 108 via the network 106. The destination device 104a-n can run a client side application establishing a communication session with external devices, such as the source device 102a-n, and the server 108 via the network 106. The platform, as disclosed herein, can be at least one of a web based platform, an application resident on the source device 102a-n, the destination device 104a-n, and so on. The host application can be, but not limited to, a web based application, a web based user interface, a web site, a mobile application, a computer application, a corporate application, an enterprise solution, and so on.

At least one user associated with the destination device 104a-n may first register with the server 108 and may create a user profile. The user profile corresponding to the destination device 104a-n can be then assigned a set of privileges specific to the at least one user of the destination device 104a-n. For example, the at least one user may be, at least one of, but not limited to, a customer, a sales man, a call center, a back end team, a vehicle service team, a vehicle dealer, a vehicle components dealer, a troubleshooting team, and so on.

In an embodiment, the server 108 may identify the received data based on the type of data received from at least one of the source device 102 and the destination device 104. In an example, the customer may provide details such as mobile number, interested model of vehicle, name, in the mobile client application 202. The provided details or data may be transmitted to server 108, which may automatically push the data to the call centre team. In an example, the call center team may further call the customer if the requested vehicle is not found in the stockyard. Further, the data may be stored in the database 110 associated with the server 108. Further, the server 108 may push back the data to the mobile client application 202 of the salesman to organize the requested vehicle to the customer.

Similarly, in case of vehicle service, the customer can book service date and time in advance from the mobile client application 202 of the customer via the at least one destination device 104a-n. The booking data may be pushed to the mobile client application 202 of service manager via the server 108. Based on the data provided by the service manager via the mobile client application 202 associated with the at least one destination device 104a-n of the service manager, the booking may be confirmed. The conformation information may be pushed to the customer via the server 108. Based on the service completion data, the server 108 may generate invoice and push to the respective mobile client application 202 of the customer associated with the at least one destination device 104a-n. In another example scenario, the sales person may send basic details, which may be collected from the customer, to the call center. The call center may contact the customer for further detailed enquiry regarding the desired vehicle. Further, a NPCC (New Prospect Customer Card) may be generated at the call center side. The dealer and back end team may be able to view the enquiry and follow up the customer regarding the purchase of vehicle. The showroom, cash and other information such as CSD (Canteen Stores Department) enquiry may be entered at the dealership. In an example, as soon as the salesmen enter the lead details along with the customer mobile number in the at least one destination device 104*a-n*, the system 100 may transmit information such as the respective vehicle model information, offers, availability, prices, and so on, to the customer mobile number through at least one of, a push notification, an Instant Messaging (IM) application or email. In another embodiment herein, the route map may be provided to the at least one destination device 104*a-n*, which may help the sales manager in generating the route plan automatically. The route plan may be generated based on the lead type. For example, the sales manager may request the at least one destination device 104*a-n* to generate route plan corresponding to the salesman. The route plan may include the information regarding the number of customers and the route map guiding towards the customers respectively.

In another embodiment, the at least one of source device 102*a-n* and the destination device 104*a-n* may work in both online/offline modes. In offline mode, the device can use a local database of the at least one source device 102*a-n* and destination device 104*a-n*. The at least one source device 102*a-n* and the destination device 104*a-n* may sync with the server 100 as soon as connectivity is established.

Further, the vehicle and the vehicle components may be scanned using a suitable means such as, but not limited to, barcode, a QR (Quick Response) code, a RFID (Radio Frequency Identification) tag, and so on. Furthermore, the Pre Delivery Information (PDI) may be captured and the information may be updated in server 108. The dealer may enter the delivery detail and the data may be stored in server 108. The information may be accessed by the call center and the customer may be called to collect feedback. Further, the back end team may validate the information associated with the delivery of the vehicle. The delivery/invoice may be sent to the customer and also a scan-able code is generated. Examples of the scan-able code can be, but not limited to, a barcode, a QR (Quick Response) code, a RFID (Radio Frequency Identification) tag, and so on. The generated code may be attached to the service booklet.

In another example scenario, the customer may book/accept the request for service appointment. The user associated with service center may pick up the vehicle. In an embodiment, the user associated with service center may receive the route map to guide the route to the vehicle which needs service. Further, based on the inspection by the service center, the user associated with the service center may provide the details of the vehicle components. Furthermore, the vehicle components may be scanned by the service person during the service of vehicle. The vehicle components may be sold to the customer based on the scanning the scan-able code on the vehicle components. The customer/job card may be generated and displayed to the customer. The job card may also be stored in the server 108 and the customer data may be retrieved through the scan-able code on service booklet. Further, the call center may perform post service follow up to the customer.

Also, the customer may track the vehicle after picking up by the user associated with the service center. The customer may also track the status of the vehicle during each stage of the service. The customer may also view the status of the service provided to the vehicle using a camera.

In an embodiment, the system 100 for managing data related to the vehicle data may also comprise at least one of, but not limited to, a voice interface, a location tracking, a multilingual feature, an electronic sales enquiry form, a reference sale report, a hierarchy for sales team, a route plan for salesman, a re-sale platform for the old vehicles, a report for salesman, a tracking of sales, tracking location of the salesman, an enquiry form for exchange of old vehicle, a customer/employees touch base, summary report regarding the sales and service of the vehicles, a rating for dealer/customer, a notification for consignment, a modification availability for Post Delivery Information (PDI), a tracking sheet for vehicle retail, an alert for payments, a sale platform for battery, a data transferred to tally, a broker client application, an inventory stock details such as availability of spares, an auto ordering mode for spares, an order tracking for vehicle components, a branch level inventory, an analysis report for inventory control, an automated inventory control, a booking of appointment, an electronic job card, an electronic form for insurance claim, a notification for vehicle service due, an insurance renewal, an Annual Maintenance Contract (AMC), a consignment notification, an expected delivery date, an item wise payment invoice, a shipment tracking, a delivery confirmation, a market place for old vehicles and so on.

In an example, the dealer may receive the vehicle from the manufacturing unit. During this process, the vehicle details such as chassis number may be scanned to compare the data stored in the database 110. Further, based on the comparison of the scanned data with the stored data, the vehicle may be marked as successfully received by dealer. After vehicle is received by dealer from the manufacturing unit, the PDI (Pre-Delivery Inspection) can be a mandatory process at dealership. In this phase, the dealer may inspect all Original Equipment (OE) components attached in the vehicle. Further, if all the OE components are genuine and in good condition then the vehicle is procured by the dealer for delivery.

In another example, if the system 100 receives new lead, then the basic details of customer is captured by the sales manager and salesman along with expected delivery date of the vehicle. Once the essential details of the lead/customer are captured then the follow-up date may be generated. Further, the sales term may include scenarios such as:

General: Particular lead may be chosen from the list of available leads and rest of the pending required details are entered.

Vehicle: the vehicle model, price may be provided. If customer require an exchange of old vehicle for purchasing new vehicle, then exchange details may be entered, which includes—vehicle brand, model, price, and purchase date.

Accessories: here additional accessories such as seat covers, bumpers and so on, can be added to the list.

Payment: the margin amount (i.e. down payment), mode of payment may be set based on the expected delivery date provided by the lead/customer.

Furthermore, based on the selection of vehicle by the customer, the chassis number of the vehicle model may be assigned to the customer. The allotted/assigned tractor may be handed over to service advisor for readiness before delivery. In the delivery phase the sales manager may proceed with the delivery process of allocated vehicle in his mobile application. The customer details may be verified and provide the vehicle manual to the customer. Further, based on the delivery the invoice may be generated and sent to the customer.

In an embodiment, the at least one destination device 104*a-n* may be provided for integrating the user identity document. The identity information may be integrated with API provided by relevant authority to gain the customer details automatically from the relevant authority records based on the finger/iris scan of the customer. In another embodiment, the system 100 may be integrated with land details of the customer. The land details may be acquired by relevant authority database, for obtaining the land details of customer. In an embodiment, the land details may be required to maintain the profile of customer and to target the specific customer to sell the vehicle such as tractor. In another embodiment herein, the system 100 may be integrated with social messenger applications.

In an embodiment, the system 100 is configured to detect, by at least one source device 102*a-n*, a plurality of a wide area UHF-RFID (Ultra High Frequency—Radio Frequency Identification) tags coupled to at least one of the vehicle and plurality of the vehicle components. In an example, the UHF-RFID tags may be rugged type tags, that may be suitable for outdoor environments or tough warehouses and can withstand snow and ice, dust and debris, or even the crushing forces felt under a wheel. Also, the rugged type tags may withstand weathering harsh environmental conditions such as extreme temperatures and moisture. Further, the UHF-RFID tags may also be encased in a rugged shell. The rugged type RFID tag may include, but not limited to, a harsh environment RFID tag, a water proof RFID tag, a nail RFID tag, a strap RFID tag, a metal logistics RFID tag, a spiral RFID tag, a zip tie RFID tag, laminated RFID tag, and so on.

In an embodiment, the system 100 is configured to determine, by the at least one source device 102*a-n*, the detected plurality of the wide area UHF-RFID tag corresponding to at least one of the vehicle and plurality of the vehicle components. In an embodiment, the system 100 is configured to transmit, by the at least one source device 102*a-n*, to the server 108 via the communication network 106, a data associated with the determined plurality of the wide area UHF-RFID tags. In an embodiment, the system 100 is configured to receive, by the server 108, from the at least one source device 102*a-n*, the data associated with the determined plurality of the wide area UHF-RFID tags. In an embodiment, the system 100 is configured to update, by the server 108, information in a database 110 associated with the server 108, based on the received data associated with the determined plurality of the wide area UHF-RFID tags. In an embodiment, the system 100 is configured to transmit, by the server 108, to the at least one destination device 104*a-n* via the communication network 106 based on a request by at least one user via the at least one destination device 104*a-n*. In an embodiment, the system 100 is configured to receive, by the at least one destination device 104*a-n*, the request from at least one user, corresponding to the vehicle and plurality of the vehicle components.

In an embodiment, the system 100 is configured to determine, by the at least one destination device 104*a-n*, type of a user profile associated with the at least one destination device 104*a-n*. In an embodiment, the system 100 is configured to retrieve, by the at least one destination device 104*a-n*, the data from the database 108, based on the determined type of the user profile associated with the at least one destination device 104*a-n*, wherein the retrieved data comprises at least one of the vehicle and plurality of the vehicle components available in a stockyard. In an embodiment, the system 100 is configured to display, by the at least one destination device 104*a-n*, on a display unit, the retrieved data corresponding to at least one of the vehicle and plurality of the vehicle components, based on the determined type of the user profile. In an embodiment, the displaying on the display unit, corresponding to at least one of the vehicle and plurality of the vehicle components comprises at least one of, a virtual tour of the vehicle, a specification, an inventory data, and a time stamp data.

In an embodiment, the system 100 is configured to receive, by the at least one destination device 104*a-n*, a request corresponding to buying the vehicle. In an embodiment, the system 100 is configured to retrieve, by the at least one destination device 104*a-n*, the information corresponding to available vehicle in the stockyard and available accessories in the stockyard. In an embodiment, the system 100 is configured to provide, by the at least one destination device 104*a-n*, on the display of the display unit, the at least one user to customize the available vehicle, using retrieved information corresponding to the available accessories in the stockyard. In an embodiment, the system 100 is configured to transmit, by the at least one destination device 104*a-n* via the communication network 106, a data related to customization of the vehicle, to the server 108. In an embodiment, the system 100 is configured to generate, by the server 108, a customer card if the received data related to the customization of the vehicle corresponding to at least one of a buying of the vehicle and the accessories.

In an embodiment, the system 100 is configured to identify, by the server 108, via at least one source device 102*a-n*, a movement of at least one of the vehicle and plurality of the vehicle components, within the stockyard. In an embodiment, the system 100 is configured to determine, by the server 108, if at least one of the vehicle and plurality of the vehicle components is billed, based on retrieving the billing information from the database 110. In an embodiment, the system 100 is configured to alert, by the server 108, via the at least one destination device 104*a-n*, based on identifying at least one of a billing mis-match and a no billing information.

In an embodiment, the system 100 is configured to receive, by the at least one destination device 104*a-n*, a request corresponding to book a service appointment based on a reminder provided on the display of the display unit. In an embodiment, the system 100 is configured to retrieve, by the at least one destination device 104*a-n*, the information from the server 108 corresponding to the received request. In an embodiment, the system 100 is configured to display, by the at least one destination device 104*a-n*, an available slots and nearest service center based on the determined location via at least one destination device 104*a-n* associated with the received request. In an embodiment, the system 100 is configured to provide, by the at least one destination device 104*a-n*, a tracking details to the at least one user corresponding to at least one of, the vehicle, the vehicle components, a replacement of the vehicle components, a service details, and a service advisor based on receiving request to book the service appointment.

In an embodiment, the system 100 is configured to receive, by the at least one destination device 104*a-n*, a request corresponding to place an order for plurality of the vehicle components. In an embodiment, the system 100 is configured to initiate, by the at least one destination device 104*a-n*, via server 108, the order corresponding to the received request associated with the vehicle components. In an embodiment, the system 100 is configured to transmit, by the at least one destination device 104*a-n*, via the communication network 106, the order details to the at least one destination device 104*a-n* after placing the order corresponding to the vehicle components.

In an embodiment, the system 100 is configured to determine, by the at least one destination device 104*a-n*, the communication network 106 status of the at least one destination device 104a-n upon receiving the input from the at least one user. In an embodiment, the system 100 is configured to retrieve, by the at least one destination device 104a-n, the data related to at least one of the vehicle and plurality of the vehicle components from an internal database of the destination device 104a-n, if the communication network (106) status of the at least one destination device 104a-n is determined to be offline. In an embodiment, the system 100 is configured to display, by the at least one destination device 104a-n, the retrieved data on a display unit of the at least one destination device 104a-n.

In an embodiment, the detected plurality of wide area UHF-RFID tags coupled to at least one of the vehicle and plurality of the vehicle components comprises identifying at least one of, the vehicle, plurality of the vehicle components, and the vehicle comprising plurality of the vehicle components.

In an embodiment, the transmitted data to the server 108, corresponding to the determined plurality of wide area UHF-RFID tags comprises data associated with at least one of a part number, a vehicle type, a vehicle name, a location to fixate plurality of the vehicle component in the vehicle, a cost of the vehicle component, a date of manufacture, a time stamp of arrival and exit from a stockyard, a historical data of the vehicle, a color, a feature, and related accessories.

In an embodiment, the updated information corresponding to the determined plurality of wide area UHF-RFID tags comprises information corresponding to at least one of the time-stamp, the inventory, a vehicle service data, a life cycle of plurality of the vehicle component, a location, a date of manufacture, and a warranty details.

The diagram of FIG. 1 illustrates functional components of the computer implemented system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Figure 2:
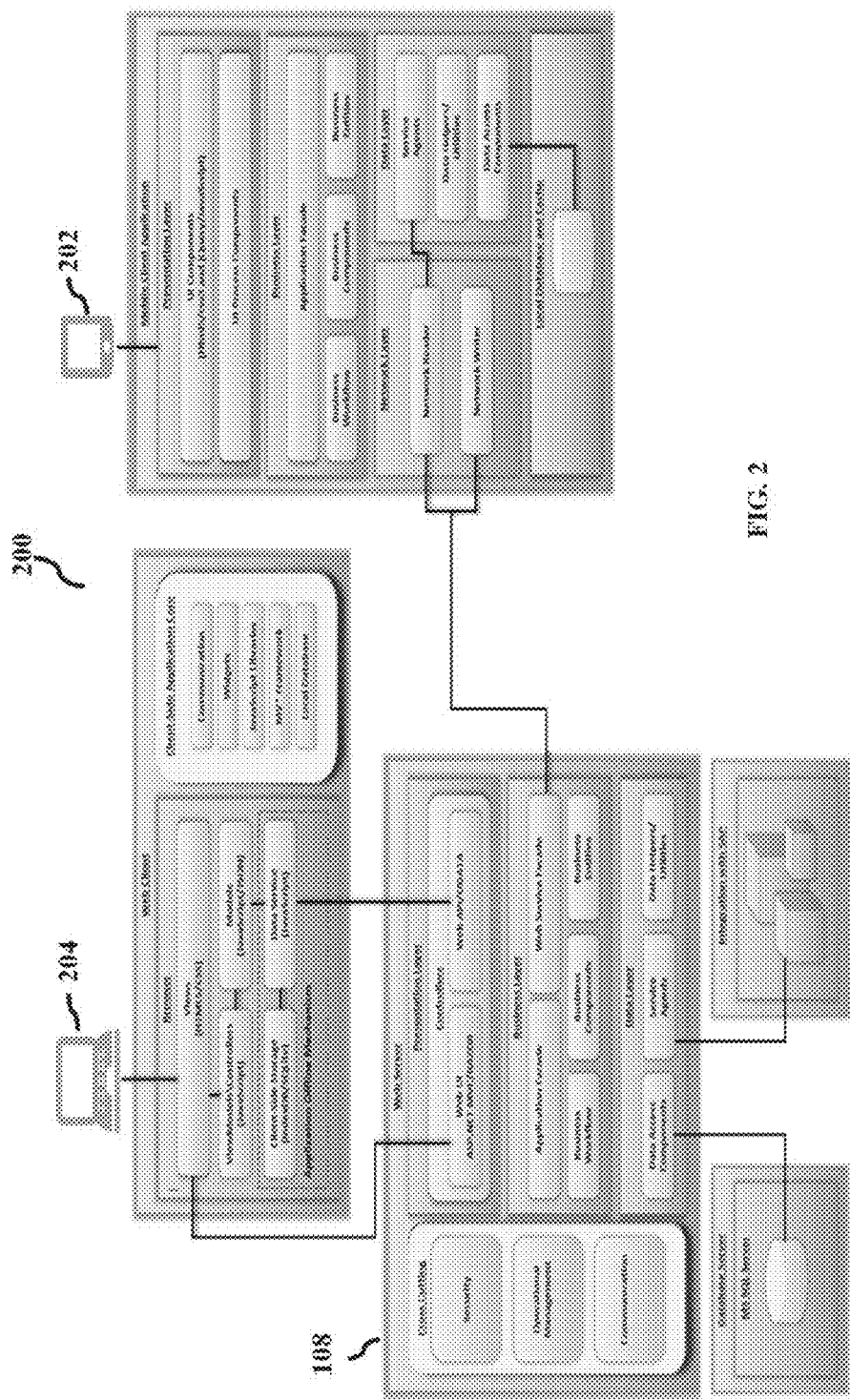
FIG. 2 illustrates a schematic diagram of a computing environment implementing the system for managing the data related to the vehicle, according to embodiments as disclosed herein.

FIG. 2 illustrates a schematic diagram of computing environment 200 implementing the system 100 for managing the data related to the vehicle, according to embodiments as disclosed herein. In an embodiment, the computing environment 200 implementing the system 100 for managing the vehicle data comprises a server/web server 108, a mobile client application 202, and a web client application 204, communicatively connected to each other via a network 106 (not shown here). The mobile client application 202 may reside in the at least one destination device 104a-n. Further, the web client application 204 may reside in the at least one destination device 104a-n. The web client application 204 may further comprise, but not limited to, a communication interface, a widget, java script libraries, a frame work, a local database and so on. The mobile client application 202 may comprise, but not limited to, User Interface (UI) components, a UI process component, a work flow components, network layer components, data layer components and so on. In another embodiment, the server 108 comprises, but not limited to, presentation layer components such as controllers, data layer components, controller components and so on. Further, the server 108 may comprise a security module, an operational management module, a communication module and so on. The web client application 204 may include presentation layer and the mobile client application 202 may include business implemented logics imbedded into mobile client/presentation layer. The server 108 may comprise at least one of pushing, pulling and storing the at least one of data and communications between at least one of the source device 102a-n and the destination device 104a-n.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

Figure 3:
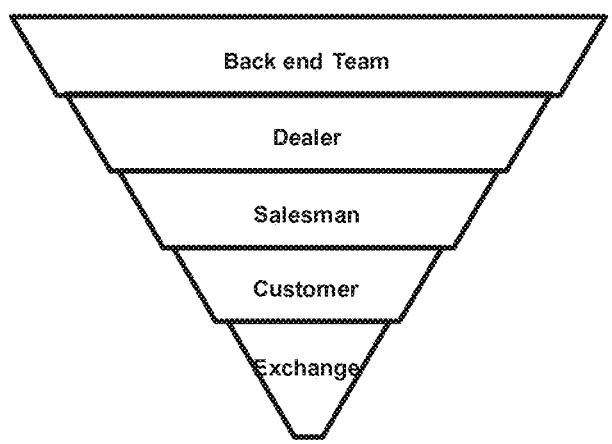
FIG. 3 illustrates an overall view of the access control of the system for managing the data related to the vehicle in computing environment, according to embodiments as disclosed herein.

FIG. 3 illustrates an overall view of the access control of the system 100 for managing the data related to vehicle in computing environment 200, according to embodiments as disclosed herein. In an embodiment, the at least one destination device 104a-n may include at least one of the user profile, but not limited to, salesman, customer, backend team, call center, service person, dealer, resale executive and so on. In an embodiment, the server 108 may be configured to identify the at least one destination device 104a-n and the user profile associated with the at least one destination device 104a-n based on the received input data. Further, identifying comprises determining the characteristics of the at least one destination device 104a-n. The at least one destination device 104a-n comprising the user profiles may be configured to provide the user level access in the hierarchy such as but not limited to:

Level 1: Back end Team Profile
Level 2: Dealer profile
Level 3: Salesman profile
Level 4: Customer profile
Level 5: Vehicle exchange profile The backend team profile may include at least one of the roles such as Territory Manager (TM), Customer Care Manager (CCM), Area Sales Manager (ASM), State Head (SH), Zonal manager (ZM), Senior Vice President (SVP), and so on. Further, each role may include information with respect to respective dealership and area in a city/state of interest. The information includes analytics view and approval workflows such as incentives, warranty claims, PDI claims events, targets etc. In an example the back team includes, but not limited to higher authority of a company such as Vice President (VP), Territory Manager (TM), Customer Care Manager (CCM), and so on.

In another embodiment, the user profile access may be configured to identify at least one destination device 104a-n and the user profile corresponding to the at least one destination device 104a-n based on the received input data. In an embodiment, the identification may be based on mobile number, user id and role of the respective user profile.

Figure 4:
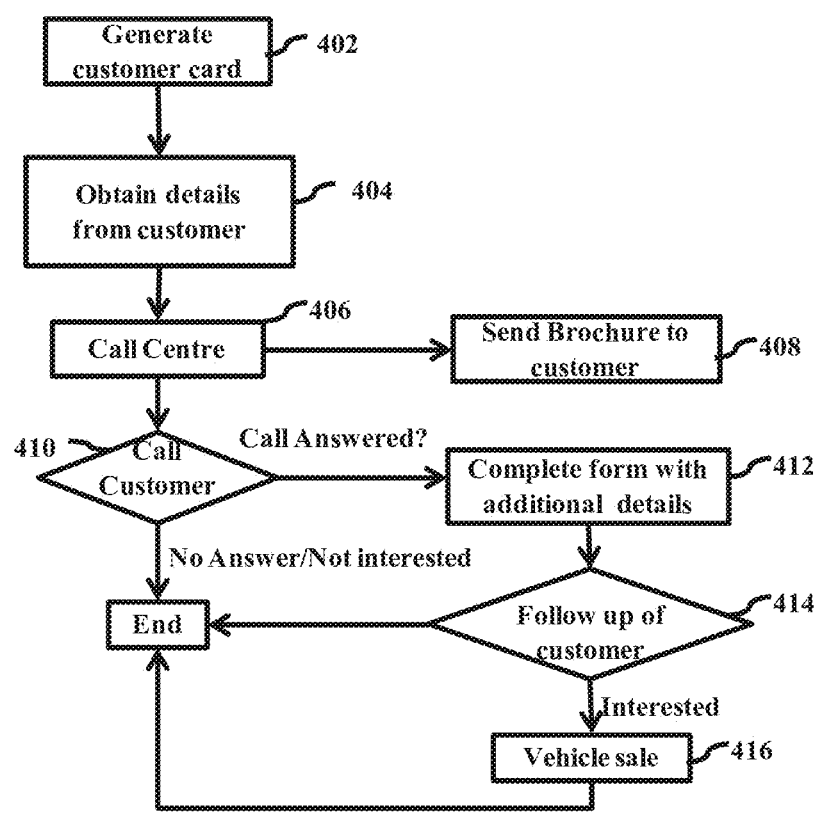
FIG. 4 illustrates a flow diagram of example scenario for process of selling the vehicle, according to embodiments as disclosed herein.

FIG. 4 is a flow chart depicting an example scenario for the process of selling a vehicle, according to embodiments as disclosed herein.

In an example, the salesman may acquire the details by visiting the customer place, if the customer could not find the desired vehicle via the mobile client application 202 associated with the at least one destination device 104a-n. The acquired details are entered in a mobile client application 202 associated with the salesman destination device 104a-n. Further, the customer may be called by the call center to obtain further more details from the customer.

At a step 402, a customer card is generated based on the information acquired from the at least one destination device 104a-n. The at least one destination device 104a-n may comprise the user profile such as salesman, dealer, referral, call center and so on. At a step 404, the salesman may obtain details from the customer. The details may include, but not limited to, a name, a mobile number/phone number, an interested model of vehicle and so on. Further, the details from the customer may be obtained by at least one of but not limited to voice recording and the like. Further, the salesman maybe provided with the location of the customer and route plan and also, the salesman may be tracked by destination device 104a-n. At a step 406, the call center or any authorized user may call the customer to obtain additional details. At a step 408, the call center may provide additional information (such as brochure) to the customer regarding the information of the plurality of vehicles. The information can be a brochure, automatically sent by the server 108 to the at least one destination device 104a-n associated with the customer. Further, the customer may be communicated by the call center or authorized user via an instant messenger application. At a step 410, the call center or any authorized person may call the customer to enquire regarding the interest for buying the vehicle. At a step 412, if the customer is interested to buy the vehicle, then the details may be obtained from customer regarding the model of the vehicle. At a step 414, the customer may be called by the call center or any authorized user to follow up regarding the purchase of the vehicle. At a step 416, based on follow up call, the customer may purchase the vehicle if interested. The customer may be provided with the invoice and documents via electronic means such as email. Further, the vehicle may be attached with scan-able code for future reference of the vehicle. Furthermore, the vehicle details and the details regarding the delivery of the vehicle may be stored in the database for future reference. Based on the details acquired by the call center or authorized user, the customer may be called to re-check the delivery and satisfaction of the service provided by the showroom/vehicle.

In another example, the customer may conclude an interest in the vehicle using the mobile/web client application 202/204 and receive the access to view the available vehicles. The vehicles available in the stockyard can comprise a unique identification means such as UHF-RFID that can be scanned. The vehicle may be scanned at the entry and exit of the stockyard, and the database 110 may be accordingly updated. The information is stored in the database 110 and may be accessed by the mobile/web client application 202/204. The mobile/web client application 202/204 may enable the customer to virtually tour the vehicle (both internally and externally), wherein the color, features, accessories and so on may match with the vehicles present in the stockyard. The customer can also use the mobile/web client application 202/204 for performing additional steps such as viewing the history of the vehicle such as, but not limited to, date of manufacture, arrival in the stockyard, and so on. The mobile/web client application 202/204 may allow the customer to customize the vehicle using the accessories offered by at least one of manufacturer, showroom, and so on. The mobile/web client application 202/204 can also enable the customer to block the vehicle, on making a predetermined booking amount as payment.

Also, if the customer books the vehicle that is not available with the dealer, the application enables the customer to track the order that may be verified by the dealer in response to booking by the customer. The customer may also track the corresponding vehicle across the chain of manufacture and delivery, until the delivery of the vehicle. The mobile/web client application 202/204 may be provided to the sales persons for enabling the said features to the customers.

Further, the dealer inventory management may be performed using the similar application such as mobile/web client application 202/204. The mobile/web client application 202/204 may be used by the dealer to monitor and ensure security of the vehicles present in the stockyard. The mobile/web client application 202/204 of the dealer may be alerted, if the vehicle and plurality of the vehicle components is detected at the entry and exit of the stockyard. Furthermore, plurality of the vehicle components may be monitored using the at least one source device 102a-n. Each vehicle component of the vehicle may be equipped with the UHF-RFID tag. The UHF-RFID tag may comprise information such as a part number, the vehicle type/name, location to fixate the vehicle component, the cost of the part, date of manufacture of the part, and so on. The UHF-RFID tag shall be of a rugged type, which can withstand use in a vehicle, including, but not limited to, exposure to high temperatures, dust, vibration, fumes, liquids, and so on. The UHF-RFID tag may allow updating the information present in the tag, for example, the cost of the part, and so on.

The warehouse/service center may comprise a plurality of RFID sensors or RFID antennas. The RFID sensor or RFID antennas may read data from all vehicle components entering or leaving the premises. The at least one source device 102a-n including the RFID sensors or RFID antennas may scan the vehicle components, which are coupled to the vehicle, which are entering the service premises. The arrangement of the RFID sensors or RFID antennas may ensure that all components of the vehicle are scanned. The RFID sensors or RFID antennas can be stationary or movable. The RFID sensors or RFID antennas may be connected to server 108, wherein the RFID sensors or RFID antennas can update the information related to the parts in the server 108. The updated information may comprise movement of the vehicle components, with corresponding time stamps. The server 108 can monitor via the at least one source device 102a-n, the presence of plurality of the vehicle components in the vehicle, including the historical data, replace/repair time of the vehicle components, and so on. The server 108 may ensure that all vehicle components are billed by identifying the movement of the vehicle components with the billing system, to ensure that all the parts have been billed correspondingly. This can help in avoidance of pilferage.

Furthermore, the customer may also connect to the destination device 104a-n to the server 108 to monitor the vehicle components in the vehicle, and retrieve the information such as life cycle, replacement, genuineness, and so on corresponding to the vehicle components. The server 108 may also provide information to service personnel about the availability of specific vehicle components, location of the vehicle components, information related to the vehicle components such as date of manufacture, cost, and so on.

In an example, the mobile/web client application 202/204 may enable the customer to book service appointment for the vehicle. The mobile/web client application 202/204 may track the usage of the vehicle and may also provide reminders to the customer accordingly, based on expiration of a pre-defined period or a pre-determined distance being completed. The mobile/web client application 202/204 may fetch the information from the server 108 or may be provided by the customer. The mobile/web client application 202/204 may check for available slots at a service center, wherein the user can indicate the service center of interest or may merely mention the closest service center, based on the available slots and convenience to the customer. The mobile/web client application 202/204 may transmit the alert to the service center to inform the information related to, booked service appointment, the details of the vehicle such as the service history, and so on. The mobile/web client application 202/204 may add the appointment information to the customer calendar and may push appropriate reminders to the user. The mobile/web client application 202/204 may also provide details about the service advisor assigned to the customer in advance and contact details. The mobile/web client application 202/204 may further provide a list of at least one of tasks, are placement, a service, and so on, to be performed on the vehicle. The list is provided based on at least one of, a pre-defined time period, a pre-determined distance being covered, notes/comments provided in previous service sessions. The mobile/web client application 202/204 can further provide the customer with an approximate cost of the service, including a labor cost, a price of the vehicle components, and so on. The mobile/web client application 202/204 can be in communication with the server 108 to check the vehicle components that need to be replaced, availability, cost, and so on.

The mobile/web client application 202/204 can also enable the user to provide notes/comments to the service advisor, about an instructions or concerns related to the vehicle. The mobile/web client application 202/204 may enable the user to check the spare parts that have been used in the vehicle, based on information present in the server 108. The mobile/web client application 202/204 can enable the service advisor to communicate with the customer and update about, at least one of, additional tasks to be performed, the progress of the service, and so on.

Figure 5A:
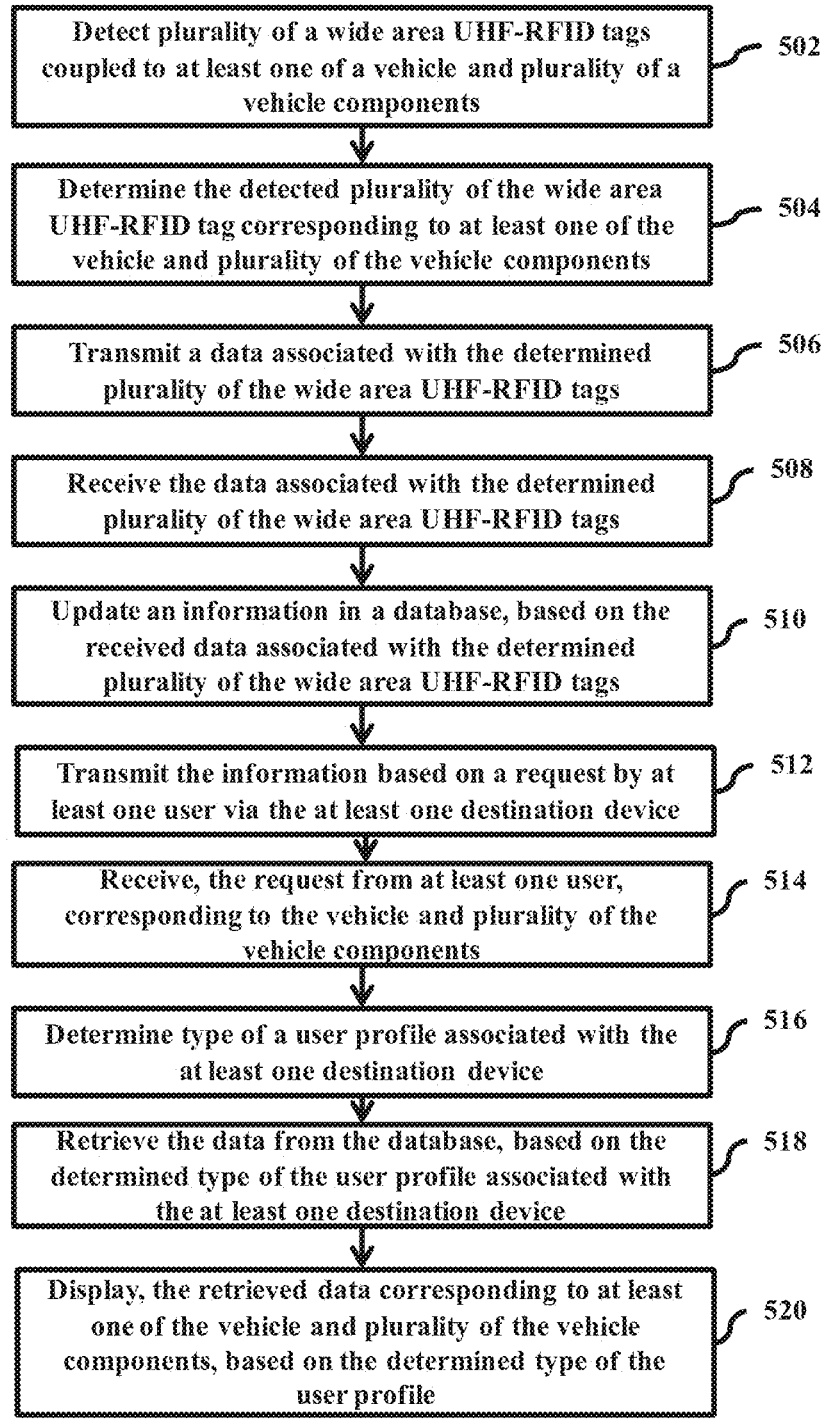
FIG. 5a is a flow chart depicting a method for managing data related to a vehicle, according to embodiments as disclosed herein.

FIG. 5a is a flow chart depicting a method 500a for managing data related to a vehicle, according to embodiments as disclosed herein. At step 502, the method includes detecting, by at least one source device 102a-n, a plurality of a wide area UHF-RFID (Ultra High Frequency—Radio Frequency Identification) tags coupled to at least one of a vehicle and plurality of vehicle components. At step 504, the method includes determining, by the at least one source device 102a-n, the detected plurality of the wide area UHF-RFID tag corresponding to at least one of the vehicle and plurality of the vehicle components. At step 506, the method includes transmitting, by the at least one source device 102a-n, to a server 108 via a communication network 106, a data associated with the determined plurality of the wide area UHF-RFID tags. At step 508, the method includes receiving, by the server 108, from the at least one source device 102a-n, the data associated with the determined plurality of the wide area UHF-RFID tags. At step 510, the method includes updating, by the server 108, information in a database 110 associated with the server 108, based on the received data associated with the determined plurality of the wide area UHF-RFID tags. At step 512, the method includes transmitting, by the server 108, to at least one destination device 104a-n via the communication network 106, based on a request by at least one user via the at least one destination device 104a-n. At step 514, the method includes receiving, by the at least one destination device 104a-n, the request from at least one user, corresponding to the vehicle and plurality of the vehicle components. At step 516, the method includes determining, by the at least one destination device 104a-n, type of a user profile associated with the at least one destination device 104a-n. At step 518, the method includes retrieving, by the at least one destination device 104a-n, the data from the database 108, based on the determined type of the user profile associated with the at least one destination device 104a-n, wherein the retrieved data comprises at least one of the vehicle and plurality of the vehicle components available in a stockyard. At step 520, the method includes displaying, by the at least one destination device 104a-n, on a display unit, the retrieved data corresponding to at least one of the vehicle and plurality of the vehicle components, based on the determined type of the user profile. In an embodiment, the displaying on the display unit, corresponding to at least one of the vehicle and plurality of the vehicle components comprises at least one of, a virtual tour of the vehicle, specifications, an inventory data, and a time stamp data.

The various actions in method 500a may be performed in the order presented, in a different order or simultaneously. Further, in some embodiments, some actions listed in FIG. 5a may be omitted.

Figure 5B:
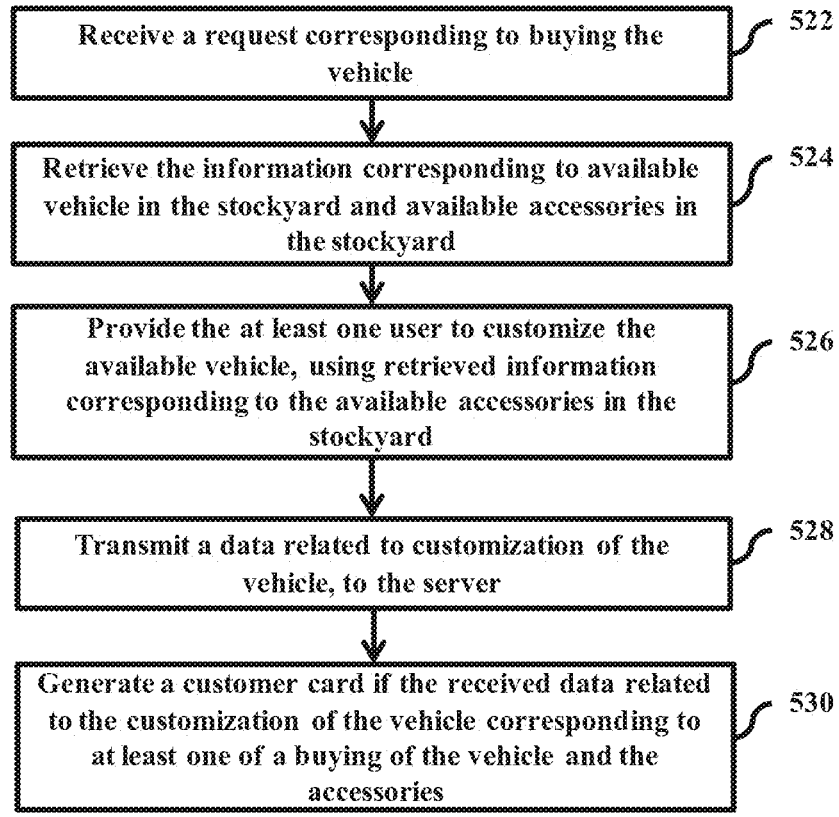
FIG. 5b is a flow chart depicting a method for generating a customer profile, according to embodiments as disclosed herein.

FIG. 5b is a flow chart depicting a method 500b for generating a customer profile, according to embodiments as disclosed herein.

At step 522, the method includes receiving, by the at least one destination device 104a-n, a request corresponding to buying the vehicle. At step 524, the method includes retrieving, by the at least one destination device 104a-n, the information corresponding to available vehicle in the stockyard and available accessories in the stockyard.

At step 526, the method includes providing, by the at least one destination device 104a-n, on the display of the display unit, the at least one user to customize the available vehicle, using retrieved information corresponding to the available accessories in the stockyard. At step 528, the method includes transmitting, by the at least one destination device 104a-n via the communication network 106, a data related to customization of the vehicle, to the server 108.

At step 530, the method includes generating, by the server 108, a customer card if the received data related to the customization of the vehicle corresponding to at least one of a buying of the vehicle and the accessories.

The various actions in method 500b may be performed in the order presented, in a different order or simultaneously. Further, in some embodiments, some actions listed in FIG. 5b may be omitted.

Figure 5C:
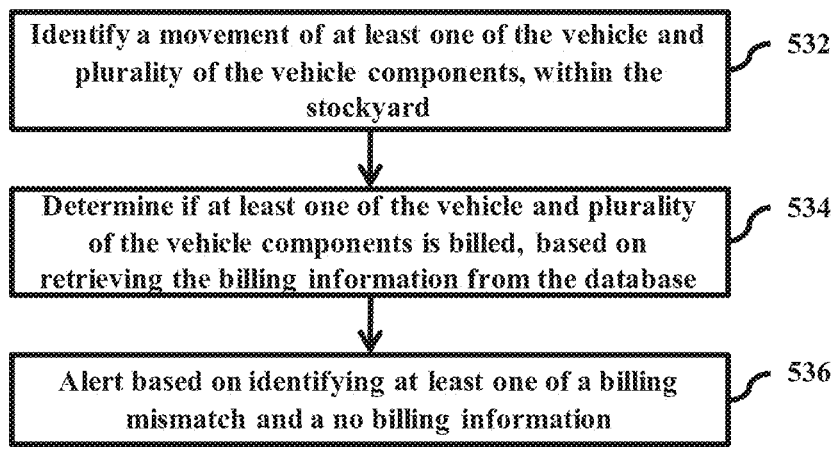
FIG. 5c is a flow chart depicting a method 500c for identifying at least one of a billing mis-match and a no billing information, according to embodiments as disclosed herein.

FIG. 5c is a flow chart depicting a method 500c for identifying at least one of a billing mis-match and a no billing information, according to embodiments as disclosed herein.

At step 532, the method includes identifying, by the server 108, via at least one source device 102a-n, a movement of at least one of the vehicle and plurality of the vehicle components, within the stockyard. At step 534, the method includes determining, by the server 108, if at least one of the vehicle and plurality of the vehicle components is billed, based on retrieving the billing information from the database 110. At step 536, the method includes alerting by the server 108, via the at least one destination device 104a-n, based on identifying at least one of a billing mis-match and a no billing information.

The various actions in method 500c may be performed in the order presented, in a different order or simultaneously. Further, in some embodiments, some actions listed in FIG. 5c may be omitted.

Figure 5D:
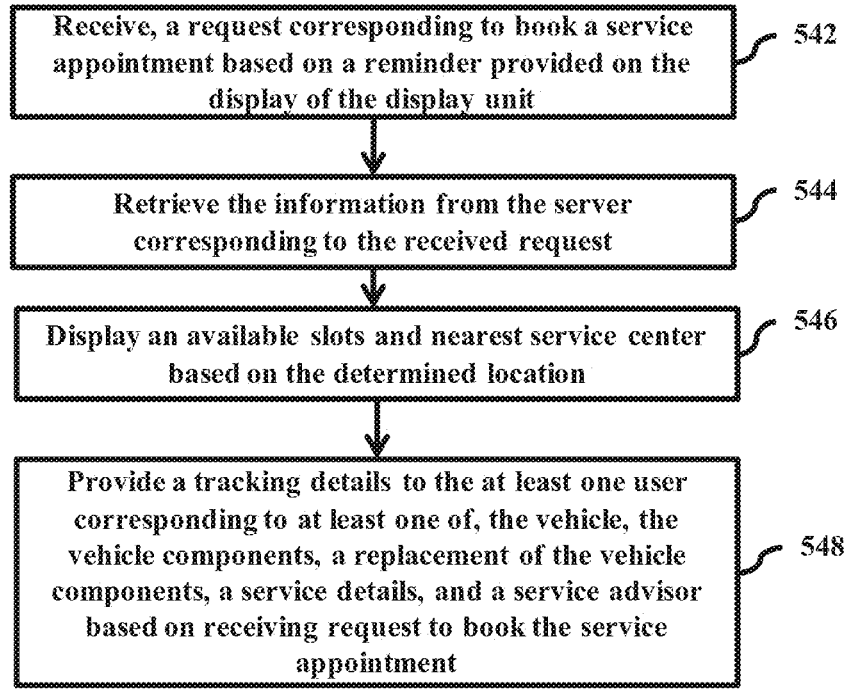
FIG. 5d is a flow chart depicting a method for providing tracking details to the at least one user, according to embodiments as disclosed herein.

FIG. 5d is a flow chart depicting a method 500d for providing tracking details to the at least one user, according to embodiments as disclosed herein.

At step 542, the method includes receiving, by the at least one destination device 104a-n, a request corresponding to book a service appointment based on a reminder provided on the display of the display unit. At step 544, the method includes retrieving, by the at least one destination device 104a-n, the information from the server 108 corresponding to the received request. At step 546, the method includes displaying, by the at least one destination device 104a-n, an available slots and nearest service center based on the determined location via at least one destination device 104a-n associated with the received request. At step 548, the method includes providing, by the at least one destination device 104a-n, tracking details to the at least one user corresponding to at least one of, the vehicle, the vehicle components, a replacement of the vehicle components, a service details, and a service advisor based on receiving request to book the service appointment.

The various actions in method 500d may be performed in the order presented, in a different order or simultaneously. Further, in some embodiments, some actions listed in FIG. 5d may be omitted.

Figure 5E:
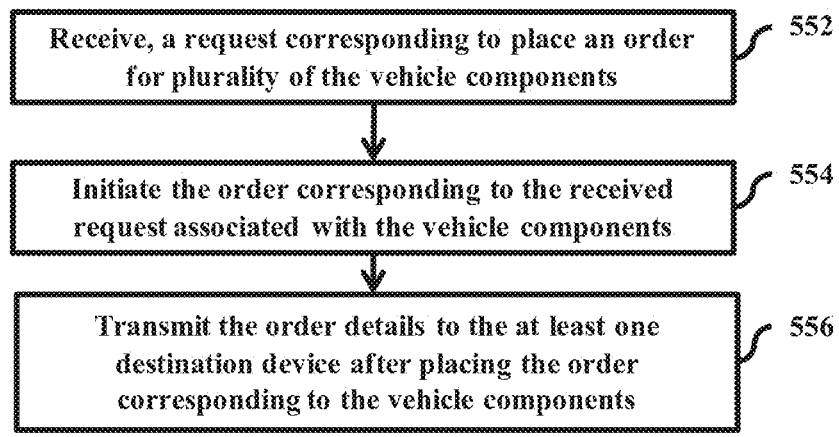
FIG. 5e is a flow chart depicting a method 500e for outputting the order details to the at least one destination device 104a-n, after placing the order corresponding to the vehicle components, according to embodiments as disclosed herein.

FIG. 5e is a flow chart depicting a method 500e for outputting the order details to the at least one destination device 104a-n, after placing the order corresponding to the vehicle components, according to embodiments as disclosed herein.

At step 552, the method includes receiving, by the at least one destination device 104a-n, a request corresponding to place an order for plurality of the vehicle components. At step 554, the method includes initiating, by the at least one destination device 104a-n, via server 108, the order corresponding to the received request associated with the vehicle components. At step 556, the method includes transmitting, by the at least one destination device 104a-n, via the communication network 106, the order details to the at least one destination device 104a-n after placing the order corresponding to the vehicle components.

The various actions in method 500e may be performed in the order presented, in a different order or simultaneously. Further, in some embodiments, some actions listed in FIG. 5e may be omitted.

Figure 5F:
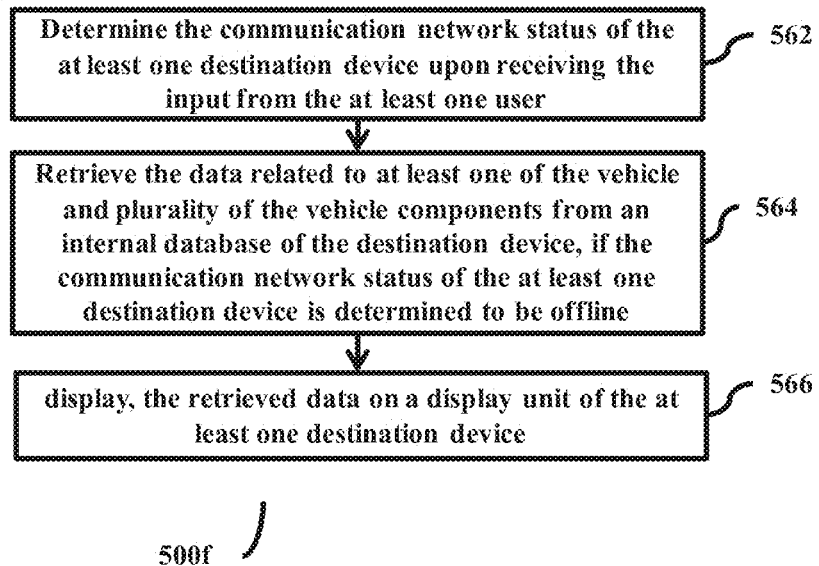
FIG. 5f is a flow chart depicting a method for outputting the data related to at least one of the vehicle and plurality of the vehicle components, according to embodiments as disclosed herein.

FIG. 5f is a flow chart depicting a method 500f for outputting the data related to at least one of the vehicle and plurality of the vehicle components, according to embodiments as disclosed herein.

At step 562, the method includes determining, by the at least one destination device 104a-n, the communication network 106 status of the at least one destination device 104a-n upon receiving the input from the at least one user. At step 564, the method includes retrieving, by the at least one destination device 104a-n, the data related to at least one of the vehicle and plurality of the vehicle components from an internal database of the destination device 104a-n, if the communication network 106 status of the at least one destination device 104a-n is determined to be offline. At step 566, the method includes displaying, by the at least one destination device 104a-n, the retrieved data on a display unit of the at least one destination device 104a-n.

The various actions in method 500f may be performed in the order presented, in a different order or simultaneously. Further, in some embodiments, some actions listed in FIG. 5f may be omitted.

The embodiments, herein may include at least one of but not limited to, multilingual support, event alerts, speech recognition, a scan-able code scan, a barcode reading support, a wireless printing, a location tracking, an effective monitoring of the business and decision making, a complete visibility in performance and profit tracking, a market place for increase in old vehicle sales and so on.

In an example, the at least one of mobile client application 202 and the web client application 204 may be multilingual and provide voice recording facility (as records) and speech recognition capabilities. The event alert notifications can be at least one of Short Message Service (SMS), in-app notifications such as sales, delivery, installation, events between the customer and dealer. The notifications may be specific to the user profile. The at least one of source device 102 and the destination device 104 may directly send the data to wireless printer for printing of invoice or the like. Further various dashboards may be provided to dealership owner for viewing current business profile and monitor business profitability at any point of time.

The embodiments herein include time saving strategy for salesman by route plan, improves sales forecasting, based on real-time sales inputs, customer may be updated about the vehicle, service due date, complaints, less manual entries, improve stock visibility and inventories, ordering the stock when inventory shoots down to the threshold level, inventory at branch level, branch sales report, dealer ratings and so on.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiment disclosed herein describes a systems and methods for managing a data related to vehicle in a computing environment. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the spirit and scope of the embodiments as described herein.

We claim:

1. A system (100) for managing data related to a vehicle comprising:
   at least one source device (102a-n) comprising a plurality of antennas, communicatively coupled to a server (108), wherein the at least one source device (102a-n) is configured to:
      detect, plurality of a wide area UHF-RFID (Ultra High Frequency—Radio Frequency Identification) tags coupled to at least one of a vehicle and plurality of a vehicle components;
      determine the detected plurality of the wide area UHF-RFID tag corresponding to at least one of the vehicle and plurality of the vehicle components;
      transmit, to the server (108) via a communication network (106), a data associated with the determined plurality of the wide area UHF-RFID tags;
   the server (108) configured to:
      receive from the at least one source device (102a-n), the data associated with the determined plurality of the wide area UHF-RFID tags;
      update information in a database (110) associated with the server (108), based on the received data associated with the determined plurality of the wide area UHF-RFID tags;
      transmit the information, to at least one destination device (104a-n) via the communication network (106), based on a request by at least one user via the at least one destination device (104a-n); and
   the at least one destination device (104a-n) communicatively coupled to the server (108), wherein the at least one destination device (104a-n) is configured to:
      receive, the request from at least one user, corresponding to the vehicle and plurality of the vehicle components;
      determine type of a user profile associated with the at least one destination device (104a-n);
      retrieve the data from the database (108), based on the determined type of the user profile associated with the at least one destination device (104a-n), wherein the retrieved data comprises at least one of the vehicle and plurality of the vehicle components available in a stockyard; and
      display, on a display unit, the retrieved data corresponding to at least one of the vehicle and plurality of the vehicle components, based on the determined type of the user profile, wherein the displaying on the display unit, corresponding to at least one of the vehicle and plurality of the vehicle components comprises at least one of, a virtual tour of the vehicle, specifications, an inventory data, and a time stamp data.

2. The system (100) as claimed in claim 1, wherein the system (100) is further configured to:
   receive, by at least one destination device (104a-n), a request corresponding to buying the vehicle;
   retrieve, by the at least one destination device (104a-n), the information corresponding to available vehicle in the stockyard and available accessories in the stockyard;
   provide, by the at least one destination device (104a-n), on the display of the display unit, the at least one user to customize the available vehicle, using retrieved information corresponding to the available accessories in the stockyard;
   transmit, by the at least one destination device (104a-n) via the communication network (106), a data related to customization of the vehicle, to the server (108); and
   generate, by the server (108), a customer card if the received data related to the customization of the vehicle corresponding to at least one of a buying of the vehicle and the accessories.

3. The system (100) as claimed in claim 1, wherein the server (108) is further configured to:
   identify, via at least one source device (102a-n), a movement of at least one of the vehicle and plurality of the vehicle components, within the stockyard;
   determine, if at least one of the vehicle and plurality of the vehicle components is billed, based on retrieving the billing information from the database (110); and
   alert, via the at least one destination device (104a-n), based on identifying at least one of a billing mismatch and a no billing information.

4. The system (100) as claimed in claim 1, wherein the at least one destination device (104a-n) is further configured to:
   receive, a request corresponding to book a service appointment based on a reminder provided on the display of the display unit;
   retrieve the information from the server (108) corresponding to the received request;
   display an available slots and nearest service center based on the determined location via at least one destination device (104a-n) associated with the received request; and
   provide, a tracking details to the at least one user corresponding to at least one of, the vehicle, the vehicle components, a replacement of the vehicle components, a service details, and a service advisor based on receiving request to book the service appointment.

5. The system (100) as claimed in claim 1, wherein the at least one destination device (104a-n) is further configured to:
   receive, a request corresponding to place an order for plurality of the vehicle components;
   initiate, via server (108), the order corresponding to the received request associated with the vehicle components; and
   transmit, via the communication network (106), the order details to the at least one destination device (104a-n) after placing the order corresponding to the vehicle components.

6. The system (100) as claimed in claim 1, wherein the at least one destination device (104a-n) is further configured to:
   determine, the communication network (106) status of the at least one destination device (104a-n) upon receiving the input from the at least one user;
   retrieve, the data related to at least one of the vehicle and plurality of the vehicle components from an internal database of the destination device (104a-n), if the communication network (106) status of the at least one destination device (104a-n) is determined to be offline; and
   display, the retrieved data on a display unit of the at least one destination device (104a-n).

7. The system (100) as claimed in claim 1, wherein the detecting plurality of wide area UHF-RFID tags coupled to at least one of the vehicle and plurality of the vehicle components comprises identifying at least one of, the vehicle, plurality of the vehicle components, and the vehicle comprising plurality of the vehicle components.

8. The system (100) as claimed in claim 1, wherein the transmitting the data to the server 108, corresponding to the determined plurality of wide area UHF-RFID tags comprises data associated with at least one of a part number, a vehicle type, a vehicle name, a location to fixate plurality of the vehicle component in the vehicle, a cost of the vehicle component, a date of manufacture, a time stamp of arrival and exit from a stockyard, a historical data of the vehicle, a color, a features, and a related accessories.

9. The system (100) as claimed in claim 1, wherein the updating information corresponding to the determined plurality of wide area UHF-RFID tags comprises information corresponding to at least one of the time-stamp, the inventory, a vehicle service data, a life cycle of plurality of the vehicle component, a location, a date of manufacture, and a warranty details.

10. The system (100) as claimed in claim 1, wherein the user profile comprises at least one of a customer, a sales man, a call center, a back end team, a vehicle service team, a vehicle dealer, and a vehicle components dealer.

11. The system (100) as claimed in claim 1, wherein the displaying, by the destination device (104a-n), on the display unit, the retrieved data corresponding to at least one of the vehicle and plurality of the vehicle components comprises displaying at least one of the vehicle and plurality of the vehicle components in the stockyard.

12. The system (100) as claimed in claim 4, wherein the reminder provided on the display of the display unit of the destination device (104a-n) comprises tracking the usage of the vehicle based on at least one of an exceeding the limit of a pre-defined period information and a completing a pre-determined distance information by retrieving the information from database (110) associated with the server (108) and receiving information by the at least one user.

13. The system (100) as claimed in claim 4, wherein the retrieving the information from the server (108) corresponding to the received request comprises at least one of, a plurality of the vehicle component details, vehicle requirement details, a pre-delivery information, a delivery validation information, a job card information, and a post service follow-up information.

14. A method (500a) for managing data related to a vehicle comprising:
  detecting, by at least one source device (102a-n), a plurality of a wide area UHF-RFID (Ultra High Frequency—Radio Frequency Identification) tags coupled to at least one of a vehicle and plurality of a vehicle components;
  determining, by the at least one source device (102a-n), the detected plurality of the wide area UHF-RFID tag corresponding to at least one of the vehicle and plurality of the vehicle components;
  transmitting, by the at least one source device (102a-n), to a server (108) via a communication network (106), a data associated with the determined plurality of the wide area UHF-RFID tags;
  receiving, by the server (108), from the at least one source device (102a-n), the data associated with the determined plurality of the wide area UHF-RFID tags;
  updating, by the server (108), an information in a database (110) associated with the server (108), based on the received data associated with the determined plurality of the wide area UHF-RFID tags;
  transmitting, by the server (108), to at least one destination device (104a-n) via the communication network (106), based on a request by at least one user via the at least one destination device (104a-n);
  receiving, by the at least one destination device (104a-n), the request from at least one user, corresponding to the vehicle and plurality of the vehicle components;
  determining, by the at least one destination device (104a-n), type of a user profile associated with the at least one destination device (104a-n);
  retrieving, by the at least one destination device (104a-n), the data from the database (108), based on the determined type of the user profile associated with the at least one destination device (104a-n), wherein the retrieved data comprises at least one of the vehicle and plurality of the vehicle components available in a stockyard; and
  displaying, by the at least one destination device (104a-n), on a display unit, the retrieved data corresponding to at least one of the vehicle and plurality of the vehicle components, based on the determined type of the user profile, wherein the displaying on the display unit, corresponding to at least one of the vehicle and plurality of the vehicle components comprises at least one of, a virtual tour of the vehicle, specifications, an inventory data, and a time stamp data.

15. The method (500a) as claimed in claim 14, the method (500b) further comprises:
  receiving, by the at least one destination device (104a-n), a request corresponding to buying the vehicle;
  retrieving, by the at least one destination device (104a-n), the information corresponding to available vehicle in the stockyard and available accessories in the stockyard;
  providing, by the at least one destination device (104a-n), on the display of the display unit, the at least one user to customize the available vehicle, using retrieved information corresponding to the available accessories in the stockyard;
  transmitting, by the at least one destination device (104a-n) via the communication network (106), a data related to customization of the vehicle, to the server (108); and
  generating, by the server (108), a customer card if the received data related to the customization of the vehicle corresponding to at least one of a buying of the vehicle and the accessories.

16. The method (500a) as claimed in claim 14, wherein the method (500c) further comprises:
  identifying, by the server (108), via at least one source device (102a-n), a movement of at least one of the vehicle and plurality of the vehicle components, within the stockyard;
  determining, by the server (108), if at least one of the vehicle and plurality of the vehicle components is billed, based on retrieving the billing information from the database (110); and
  alerting, by the server (108), via the at least one destination device (104a-n), based on identifying at least one of a billing mis-match and a no billing information.

17. The method (500a) as claimed in claim 14, wherein the method (500d) further comprises:
  receiving, by the at least one destination device (104a-n), a request corresponding to book a service appointment based on a reminder provided on the display of the display unit;

retrieving, by the at least one destination device (104*a-n*), the information from the server (108) corresponding to the received request;

displaying, by the at least one destination device (104*a-n*), an available slots and nearest service center based on the determined location via at least one destination device (104*a-n*) associated with the received request; and providing, by the at least one destination device (104*a-n*), tracking details to the at least one user corresponding to at least one of, the vehicle, the vehicle components, a replacement of the vehicle components, a service details, and a service advisor based on receiving request to book the service appointment.

18. The method (500*a*) as claimed in claim 14, wherein the method (500*e*) further comprises:

receiving, by the at least one destination device (104*a-n*), a request corresponding to place an order for plurality of the vehicle components;

initiating, by the at least one destination device (104*a-n*), via server (108), the order corresponding to the received request associated with the vehicle components; and transmitting, by the at least one destination device (104*a-n*), via the communication network (106), the order details to the at least one destination device (104*a-n*) after placing the order corresponding to the vehicle components.

19. The method (500*a*) as claimed in claim 14, wherein the method (5000 further comprises:

determining, by the at least one destination device (104*a-n*), the communication network (106) status of the at least one destination device (104*a-n*) upon receiving the input from the at least one user;

retrieving, by the at least one destination device (104*a-n*), the data related to at least one of the vehicle and plurality of the vehicle components from an internal database of the destination device (104*a-n*), if the communication network (106) status of the at least one destination device (104*a-n*) is determined to be offline; and displaying, by the at least one destination device (104*a-n*), the retrieved data on a display unit of the at least one destination device (104*a-n*).

20. The method (500*a*) as claimed in claim 14, wherein the detecting plurality of wide area UHF-RFID tags coupled to at least one of the vehicle and plurality of the vehicle components comprises identifying at least one of, the vehicle, plurality of the vehicle components, and the vehicle comprising plurality of the vehicle components.

21. The method (500*a*) as claimed in claim 14, wherein the transmitting the data to the server 108, corresponding to the determined plurality of wide area UHF-RFID tags comprises data associated with at least one of a part number, a vehicle type, a vehicle name, a location to fixate plurality of the vehicle component in the vehicle, a cost of the vehicle component, a date of manufacture, a time stamp of arrival and exit from a stockyard, a historical data of the vehicle, a color, a features, and a related accessories.

22. The method (500*a*) as claimed in claim 14, wherein the updating information corresponding to the determined plurality of wide area UHF-RFID tags comprises information corresponding to at least one of the time-stamp, the inventory, a vehicle service data, a life cycle of plurality of the vehicle component, a location, a date of manufacture, and a warranty details.

23. The method (500*a*) as claimed in claim 14, wherein the user profile comprises at least one of a customer, a sales man, a call center, a back end team, a vehicle service team, a vehicle dealer, and a vehicle components dealer.

24. The method (500*a*) as claimed in claim 14, wherein the displaying, by the destination device (104*a-n*), on the display unit, the retrieved data corresponding to at least one of the vehicle and plurality of the vehicle components comprises displaying at least one of the vehicle and plurality of the vehicle components in the stockyard.

25. The method (500*d*) as claimed in claim 17, wherein the reminder provided on the display of the display unit of the destination device (104*a-n*) comprises tracking the usage of the vehicle based on at least one of an exceeding the limit of a pre-defined period information and a completing a pre-determined distance information by retrieving the information from database (110) associated with the server (108) and receiving information by the at least one user.

26. The method (500*d*) as claimed in claim 17, wherein the retrieving the information from the server (108) corresponding to the received request comprises at least one of, a plurality of the vehicle component details, vehicle requirement details, a pre-delivery information, a delivery validation information, a job card information, and a post service follow-up information.

* * * * *